United States Patent
Farrell

(10) Patent No.: US 7,474,195 B2
(45) Date of Patent: Jan. 6, 2009

(54) TIRE PRESSURE MONITORING AND REMOTE KEYLESS ENTRY SYSTEM USING ASYNCHRONOUS DUTY CYCLING

(75) Inventor: Brian Farrell, Troy, MI (US)

(73) Assignee: Continental Automotive Systems US, Inc., Auburn Hills (*) Notice: Subject to any disclaimer, the term of this patent is extended or adjusted under 35 U.S.C. 154(b) by 477 days.

(21) Appl. No.: 10/993,066

(22) Filed: Nov. 19, 2004

(65) Prior Publication Data
US 2005/0104715 A1    May 19, 2005

Related U.S. Application Data

(60) Provisional application No. 60/523,481, filed on Nov. 19, 2003.

(51) Int. Cl.
*G06F 7/04* (2006.01)
(52) U.S. Cl. ............ 340/5.72; 340/5.64; 340/10.1; 340/825.69; 340/426.36; 340/447
(58) Field of Classification Search ........ 340/5.72, 340/10.2, 870.13, 870.31, 870.28, 5.64, 426.36, 340/825.69, 10.1, 426.13, 426.33, 5.63, 447
See application file for complete search history.

(56) References Cited

U.S. PATENT DOCUMENTS

| | | | |
|---|---|---|---|
| 5,239,306 A | 8/1993 | Siwiak et al. | |
| 5,661,651 A | 8/1997 | Geschke et al. | |
| 5,790,946 A | 8/1998 | Rotzoll | |
| 6,630,885 B2* | 10/2003 | Pyne et al. | 340/505 |
| 6,744,357 B2* | 6/2004 | Itou et al. | 340/445 |
| 6,930,588 B2* | 8/2005 | Sueoka et al. | 340/5.6 |
| 7,026,953 B2* | 4/2006 | Fujii | 340/870.16 |
| 7,095,316 B2* | 8/2006 | Kachouh et al. | 340/442 |
| 7,113,083 B2* | 9/2006 | Suitsu | 340/442 |

\* cited by examiner

*Primary Examiner*—Brian Zimmerman
*Assistant Examiner*—Omer S. Khan

(57) ABSTRACT

A device and method detects two different types of data, such as tire pressure monitoring system (TPMS) data and remote keyless entry (RKE) data and reduces current draw by duty cycling a receiver in the device asynchronously to intersperse multiple RKE sniffing periods in between consecutive, longer TPMS/RKE sniffing periods. The asynchronous duty cycle ensures that the sniffing periods conform to the actual length of the RKE data and TPMS data periods more closely, minimizing the likelihood of false wakeups caused by noise output by the receiver.

16 Claims, 1 Drawing Sheet

TIRE PRESSURE MONITORING AND REMOTE KEYLESS ENTRY SYSTEM USING ASYNCHRONOUS DUTY CYCLING

REFERENCE TO RELATED APPLICATIONS

This application claims priority to U.S. Provisional Application No. 60/523,481, which was filed on Nov. 19, 2003.

TECHNICAL FIELD

The present invention relates to controlling a combined tire pressure monitoring system and a remote keyless entry system.

BACKGROUND OF THE INVENTION

Remote keyless entry (RKE) systems are extensively used in vehicles to provide a convenient way to lock and unlock vehicle doors. Tire pressure monitoring systems (TPMS) are also being incorporated into vehicles to provide a convenient way of tracking tire pressure and notifying a user if any of the tires is experiencing low pressure. The RKE and TPMS functions may be combined into a single circuit.

The circuit will draw current even when the vehicle is turned off because it needs to be able to receive a key fob signal at any time to assess whether to unlock the vehicle door. The circuit also should be able to receive a tire pressure monitoring signal so that a user will be able to detect a low tire pressure condition as soon as it occurs. Thus, it is desirable for the circuit to have a low biasing current draw to prevent the vehicle battery from draining. This may be difficult, however, because the circuit has both a controller and receiver that must be operating nearly continuously to detect the key fob signal, thereby constantly drawing current even when the vehicle is turned off.

It is possible to reduce the overall current draw by shutting down the controller in the circuit and waking up the controller to check for a key fob signal and/or a tire pressure signal at predetermined time periods dictated by a continuously running clock because the clock itself draws very little current. To do this, the circuit may be duty-cycled in the most efficient manner possible to minimize current consumption while still guaranteeing reliable reception of TPMS and RKE data.

Every time a receiver in the circuit detects data, the controller will wake up. However, because data and noise appear alike to the receiver, using a standard synchronous duty cycle that checks for TPMS data and RKE data at the same time caused an excessive number of false wakeups in the controller due to noise output by the receiver. This is because TPMS data may need a longer verification period than RKE data and, therefore, the controller needs to be kept awake for a longer period of time to detect the TPMS data, increasing the chance that the receiver will also pick up noise that could be mistaken as data. Even though the noise will be screened out by the controller after it wakes up, these false wakeups cause the controller to draw excessive current unnecessarily. But reducing the number of actual controller wakeups may reduce the reliability of data reception.

There is a desire for a TPMS/RKE system that reduces current draw without sacrificing data reception reliability.

SUMMARY OF THE INVENTION

The present invention is directed to a system and method for detecting two different types of data, such as TPMS data and RKE data, that reduces current draw by minimizing false controller wakeups in the device. To do this, the invention duty cycles a receiver in the device asynchronously so that it checks for a first data type according to a first cycle and checks for both the first and second data type simultaneously according to a second cycle. In one embodiment, the receiver intersperses multiple RKE sniffing periods in between consecutive, longer sniffing periods where both RKE and TPMS data are sniffed.

The asynchronous duty cycle takes into account the different data configurations of the RKE data and the TPMS data and controls the length of the sniffing periods so that they conform to the actual length of the RKE data and TPMS data periods more closely. This minimizes the likelihood of false wakeups caused by noise output by the receiver.

DETAILED DESCRIPTION OF THE PREFERRED EMBODIMENT

Figure 1:
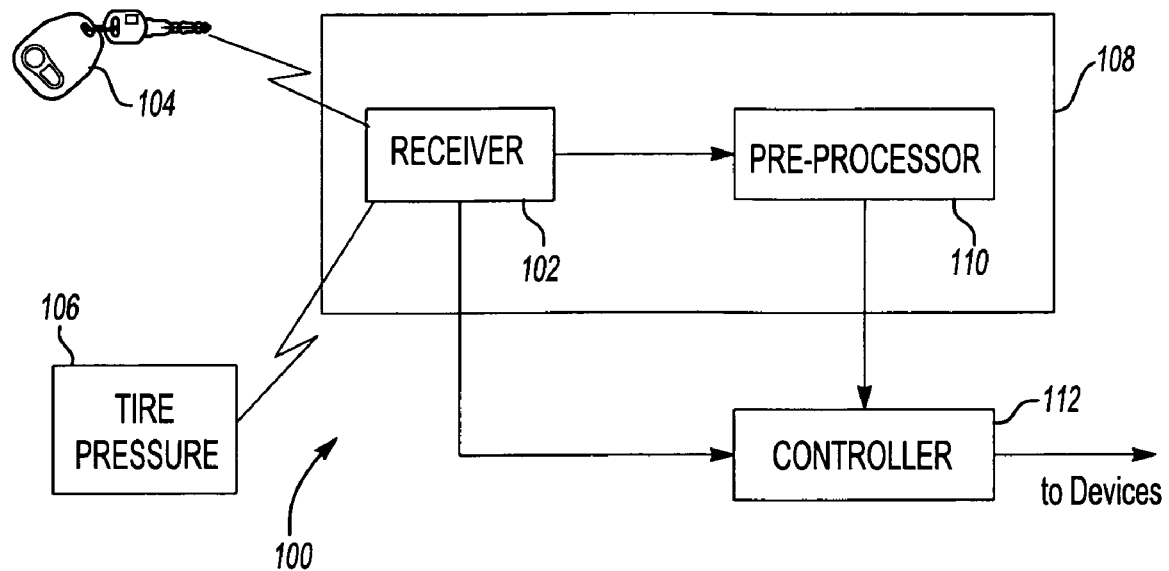
FIG. 1 is a block diagram illustrating components of a system including the TPMS/RKE device according to one embodiment of the invention.

FIG. 1 is a representative block diagram of a system 100 that checks, or "sniffs," for RKE data and TPMS data. The device includes a receiver 102 that can receive RKE data from a transmitter in a key fob 104 and TPMS data from a transmitter in a tire pressure sensor 106. The system 100 also includes a module 108 that includes a pre-processor 110 that checks the data output by the receiver 102. A controller 112 in communication with the pre-processor 110 wakes up if the pre-processor 110 indicates that the receiver 102 is outputting data and not noise and may operate one or more devices (not shown) based on the received data.

A 10 kHz receiver is assumed in this example, which means that on average, the receiver is filtered to be most sensitive to signals in the 10 kHz frequency range, even though it will also allow strong signals at other frequencies to pass through as well. The problem is that the TPMS data has a frequency of around 9.6 kHz, which is within the error tolerance of the 10 kHz receiver. Because the receiver 102 is turned on for a short period of time relative to the data rate of the TPMS data, the pre-processor 110 can detect only a limited number of edges of the TPMS data and evaluate the time difference between rising edges in the TPMS data to verify it. However, the heightened sensitivity of the receiver 102 around the 10 kHz range will cause noise around 10 kHz to pass through the receiver 102 as well.

Keeping the receiver 102 turned on for a longer period of time may be used to improve TPMS data detection by increasing the chances that the pre-processor 110 will detect the pattern of rising edges in the TPMS data. TPMS data will have a regular pattern having a given duty cycle, while noise will tend to have rising edges that occur in a random pattern. However, it is still possible for the difference between rising edges in the random noise signal to be within the range of the difference between rising edges in the TPMS data. Keeping the receiver 102 turned on longer only increases the chances that the pre-processor 110 will mistakenly wake up the controller 112 in response to noise. This is not as much of a problem when distinguishing between RKE data and noise in the RKE data range because RKE data is a stronger signal in the 2 kHz range; the RKE data signal is strong enough to pass through the receiver 102, while noise in the 2 kHz range is outside the high sensitivity window of the receiver 102.

Figure 2:
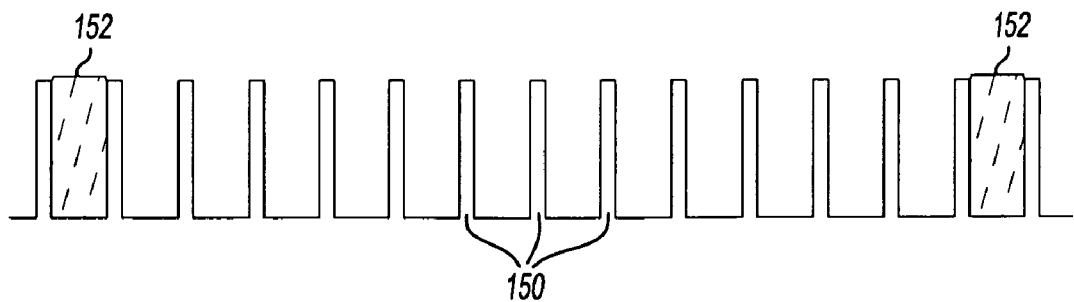
FIG. 2 is a timing diagram illustrating an asynchronous duty cycle conducting according to one embodiment of the invention.

To minimize the occurrence of false wakeups in the controller 112, the invention uses an asynchronous duty cycle where the pre-processor 110 sniffs the output of the receiver 102 for RKE data and for TPMS data according to different duty cycles. As shown in FIG. 2, module 108 sniffs for both TPMS data and RKE data at the receiver 102 only at selected intervals and sniffs only for RKE data at all other times. When the pre-processor 110 is sniffing the receiver 102 output only for RKE data during RKE sniffing periods 150, the receiver 102 turns on only for short time intervals to accommodate the relatively short time period of the RKE data. When the pre-processor 110 sniffs for both RKE data and TPMS data at the receiver 102 output during TPMS sniffing periods 152, however, the module 108 will stay turned on longer to accommodate the longer time period needed to qualify multiple rising edges of the TPMS data.

The invention therefore takes advantage of this fact by using an asynchronous duty cycle to sniff for RKE data and TPMS data. The asynchronous duty cycle allows the receiver 102 to maintain a low duty cycle while sniffing for RKE data, which is a strong signal outside of the high sensitivity frequency range of the receiver 102, and to increase the duty cycle when sniffing for TPMS data, which is within the high sensitivity range of the receiver 102 and therefore more prone to be confused with noise within the same frequency range. This maintains data detection reliability while reducing the likelihood of false controller 112 wakeups due to noise, thereby reducing the current draw of the system 100. More particularly, the invention determines the number of RKE sniffing periods 150 that can occur between the longer TPMS sniffing periods 152 and operates the module 108 accordingly, checking for RKE data more frequently than for TPMS data.

In the example shown in FIG. 2, the module 108 is duty cycled to sniff for only RKE data during the RKE sniffing periods 150. During the RKE sniffing periods 150, the pre-processor 110 will duty cycle and respond to the receiver 102 output, if any, so that the controller 112 will awaken for the selected RKE sniffing period 150 to evaluate the incoming data. In this example, the RKE data has a frequency of 2 kHz. Because the RKE data reaches the receiver 102 at 2 kHz as a strong signal and the receiver is a 10 kHz receiver, the RKE data will fall within one of the duty cycles regardless of when the RKE data is transmitted.

In one example, the module 108 is duty cycled so that it will check for RKE data only during RKE sniffing periods of approximately 450 ms. If the pre-processor 110 detects any noise or data with a data rate higher than the RKE data rate (e.g., 2 kHz), the module 108 ends the RKE sniffing process and shuts off for the remainder of the duty cycle because it is clear that the signal being received by the receiver 102 is not RKE data. Because the average noise rate output by the 10 kHz receiver is 10 kHz, this allows the module 108 to maintain a very low duty cycle while still sniffing for RKE data reliably.

The length of the RKE sniffing period itself is determined based on the required number of received EIs (edge intervals) needed to validate incoming RKE data. In one embodiment, 3 EIs are required for validation to ensure accurate detection of RKE data while maintaining a reasonable duty cycle. If an invalid edge is detected during the RKE sniffing period, then the module 108 will be turned off at that point instead of waiting for the RKE sniffing period to expire, reducing overall quiescent current draw. In other words, when it is clear to the pre-processor 110 that the receiver 102 is outputting noise, it will shut down in the module 108 for the remainder of the RKE sniffing period to put the module 108 to sleep more quickly.

In a worst-case example where the receiver starts the RKE sniffing period at a rising edge of an edge interval EI X. Given this situation, the first rising edge that the receiver 102 would detect after settling would be EI X+1. Therefore, the rising edge of EI X+2 would be the second valid rising edge detected by the receiver, the rising edge of EI X+3 would be the third, and the rising edge of EI X+4 would be the fourth, thereby providing three valid rising edge intervals. To detect three valid rising edge intervals, the RKE sniffing period must be at least 4.0 ms. However, the bit rate tolerance of the RKE receiver is, for example, 8%, which means the minimum RKE data detection time must be increased to 4.32 ms to compensate for this tolerance. Taking jitter (i.e., deviations in the signal frequency outside the expected frequency due to reduced signal strength) in the RKE signal into account increases the length of the RKE sniffing period 150 to 4.428 ms. Other components, such as a clock (not shown) in the module 108 may add another 2% of tolerance, resulting in a total RKE sniffing period of 4.52 ms in this example.

Note that although the above example describes a worst case scenario for the RKE sniffing period, this worst-case period is not used to calculate the module 108 duty cycle. Instead, the average RKE sniffing period is used to determine the module 108 duty cycle because the module 108 is designed to turn off, more often than not, before the end of the duty cycle, lowering current drain. More particularly, because the RKE sniffing period ends as soon as the pre-processor 110 detects that the receiver 102 is outputting pulse at a rate greater than 2 kHz (plus tolerances), the average RKE sniffing period becomes very short when a 10 kHz receiver is used. This average value was found to be around 215 microseconds in experimental cases.

Turning now to the TPMS sniffing period, in this example the module 108 will remain turned on for the entire TPMS sniffing period until the TPMS sniffing period timeout occurs, regardless of the detection of invalid edges. This extended sniffing period ensure that a selected number of consecutive valid edges can be detected to verify the TPMS data.

In one example, the TPMS data has a data frequency of 9.6 kHz and is in the form of a burst of packets. For this reason, the receiver is duty cycled in a manner that guarantees detection of a whole TPMS frame. Keeping the receiver on for an extended time period ensures that the receiver will receive an entire TPMS packet burst. Because the data rate of TPMS data is very close to the average noise output of the RF receiver, the number of required consecutive bits should be a large number to limit the number of false wakeups and ensure that the controller will wake in response to a packet instead of noise. In one example, each TPMS packet will contain 40 bits, and the controller 112 is awakened by the pre-processor 110 after the receiver 102 receives 35 bits that are within tolerance. Waking the controller 112 based on a selected number of consecutive bits rather than on detected edges when checking for TPMS is preferred because the extended TPMS sniffing period may result in false wakeups due to edges caused by noise.

To determine the TPMS sniffing period, the number of received EIs required to consider RF data valid needs to be decided because the RKE is also sniffed during the TPMS sniffing period. In one example, a TPMS frame comprises 80 bits at a frequency of 9.6 kHz. This results in a nominal frame time of 8.32 ms. Also, in this example, the time between TPMS frames is 52.5 ms. Thus, the TPMS sniffing period required to ensure that a complete TPMS frame is detected is approximately 69.14 ms. However, the bit rate tolerance of the TPMS telegram is 5%, which means the minimum TPMS sniffing period should be increased to 72.60 ms to accommodate this tolerance. Other components in the module 108 may add another 2% of tolerance, resulting in a total TPMS sniffing period of 74.06 ms. Note that during the TPMS sniffing period, the receiver will also sniff for RKE data during the entire TPMS sniffing period.

As shown in FIG. 2, the receiver is also turned off between RKE sniffing periods to reduce current draw. The RKE telegram is 48.6 ms, but the longest period of constant data is only 40 ms. If the pre-processor 110 does not direct three consecutive valid rising edge intervals during the RKE sniffing time, the module 108 goes back to sleep just long enough so that it does not miss qualifying an RKE telegram. This means that the selected period for the module's OFF time must be short enough to allow at least the last 6 EIs of the RKE telegram to be seen by the receiver. In a worst-case situation where the 4.52 ms RKE sniffing period ends just before the end of the rising edge of sixth EI (EI 5) of the RKE telegram. The next RKE sniffing period would need to begin soon enough for the pre-processor 110 to see the last 6 rising edges output by the receiver 102 because the first two rising edge are required for receiver settling. The following figure considers a worst-case tolerance of the transmitter of −8%. In this example, the worst-case scenario gives a maximum time of 28.98 ms between the end of the 4.52 ms RKE sniffing period to the start of the next RKE sniffing period. However, after considering possible jitter (e.g., 10%), the resulting maximum time between RKE sniffing periods is 28.79 ms. After subtracting the 2% tolerance of the CPU clock, the resulting module OFF time between RKE sniffing periods is 28.21 ms in this example.

As noted above, the system 100 sniffs for RKE data and for TPMS data asynchronously to reduce false controller wake-ups and reduce current draw. Because the RKE sniffing periods and the TPMS sniffing periods are implemented asynchronously, there will be one or more consecutive RKE sniffing periods that will occur between consecutive TPMS sniffing times, as shown in FIG. 2. The number of RKE sniffing periods that occur between TPMS sniffing periods is determined by the number and timing of the TPMS data frames.

More particularly, in the illustrated example, the tire pressure monitor sends nine ASK TPMS data frames in one burst. Each TPMS data frame in this example is 8.32 ms and the time between frames is 52.5 ms. An entire one of these nine frames must be detected by the receiver. The worst case situation is that a previous TPMS sniffing period ends just before the first TPMS data frame. The next TPMS sniffing period must therefore start within 478.24 ms. However, this value is reduced by 5% due to the tolerance of the TPMS burst, resulting in a time separation of 454.3 ms between consecutive TPMS sniffing periods.

Next, the number of RKE duty cycles that can be performed between the TPMS sniffing periods is determined. In this example, the length of an RKE duty cycle is 32.73 ms. However, this value could be up to 2% greater due to the tolerances of the module 108 components. Therefore, 33.39 ms is used as the RKE duty cycle period in this example. As a result, thirteen RKE duty cycles would result in a total time of 434.07 ms. An extra RKE sniffing period is also performed before the TPMS sniffing period; therefore, an additional 8.37 ms is considered along with the thirteen duty cycles in this example. This yields a total of 442.44 ms for fourteen RKE duty cycles, which is still less than the 454.3 ms time in between consecutive TPMS sniffing periods.

Adding a fifteenth RKE duty cycle period would add too much time between TPMS sniffing periods; therefore, fourteen RKE sniffing periods is the maximum number of RKE sniffing periods that can be conducted between consecutive TPMS sniffing periods in this example. After every fourteen RKE sniffing periods, the module is turned on for an extended time period (e.g., 70 ms) to guarantee the detection of an entire TPMS data frame within a TPMS data burst.

Regardless of the specific time frames used to conduct the asynchronous duty cycling, the spacing between consecutive TPMS sniffing periods allows multiple RKE sniffing periods to occur between them. Thus, the module is turned on for a short time period when sniffing only for RKE data and for a longer period of time when specifically sniffing for both TPMS and RKE data. This ensures that both TPMS and RKE data are detected reliably while minimizing false controller wakeups due to noise, which would ordinarily occur if the module were turned on for the longer TPMS sniffing period every time it checked for either TPMS or RKE data.

By sniffing for RKE data and TPMS data asynchronously, the inventive system and method minimizes current draw and false controller wake-ups while still ensuring that RKE and TPMS data is detected reliably. Rather than simply sniffing for RKE and TPMS data synchronously, the invention takes into account the different characteristics of RKE and TPMS data and conducts sniffing accordingly by inserting consecutive RKE sniffing periods between consecutive TPMS sniffing periods and conducting RKE sniffing and TPMS.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A data detection device, comprising:
 a receiver for receiving first data and second data;
 a module that checks for the first data over a first duty cycle and checks for the second data over a second duty cycle that is asynchronous with the first duty cycle, wherein the module causes a controller to operate in a different mode when the receiver receives at least one of the first data and the second data, wherein the first duty cycle includes a first sniffing period and the second duty cycle includes a second sniffing period, and the module checks for only the first data during the first sniffing period and checks for both the first data and the second data during the second sniffing period.

2. The data detection device of claim 1, wherein the module comprises:
 a pre-processor that checks for the first data and the second data, wherein the pre-processor causes the controller to operate in the different mode by awakening when the receiver receives at least one of the first data and the second data.

3. A data detection device, comprising:
 a receiver for receiving first data and second data;
 a module that checks for the first data over a first duty cycle and checks for the second data over a second duty cycle that is asynchronous with the first duty cycle, wherein the module causes a controller to operate in a different mode when the receiver receives at least one of the first data and the second data, the first duty cycle includes a first sniffing period and the second duty cycle includes a second sniffing period, wherein the first duty cycle intersperses a plurality of first sniffing periods in between two consecutive second sniffing periods in the second duty cycle.

4. The data detection device of claim 1, wherein the first sniffing period is shorter than the second sniffing period.

5. The data detection device of claim 1, wherein at least one of the receiver and the module turns off for a remainder of the first sniffing period if the receiver detects noise during the first sniffing period.

6. The data detection device of claim 1, wherein at least one of the receiver and the module stays on for a remainder of the second sniffing period even if the receiver detects noise during the second sniffing period.

7. The data detection device of claim 1, wherein the preprocessor module wakes the controller if the receiver receives a selected number of consecutive edge intervals of the first data.

8. The data detection device of claim 1, wherein the preprocessor wakes the controller if the receiver receives a consecutive number of bits of the second data.

9. A data detection device, comprising:
a receiver for receiving first data and second data;
a module that checks for the first data over a first duty cycle and checks for the second data over a second duty cycle that is asynchronous with the first duty cycle, wherein the module causes a controller to operate in a different mode when the receiver receives at least one of the first data and the second data, the first data is remote keyless entry (RKE) data and the second data is tire pressure monitoring system (TPMS) data, wherein the module checks for only the first data during the first sniffing period and the checks for both the first data and the second data during the second sniffing period.

10. A data detection method, comprising:
checking for receipt of first data over a first duty cycle;
checking for receipt of second data over a second duty cycle that is asynchronous with the first duty cycle, wherein the first duty cycle includes at least one first sniffing period and the second duty cycle includes at least one second sniffing period, wherein checking for receipt of the first data occurs during the first sniffing period, and checking for receipt of both the first data and the second data occur during the second sniffing period; and
waking a controller when at least one of the first data and the second data are received.

11. The data detection method of claim 10, wherein the first duty cycle intersperses a plurality of first sniffing periods in between two consecutive second sniffing periods in the second duty cycle.

12. The data detection method of claim 10, wherein the first sniffing period is shorter than the second sniffing period.

13. The data detection method of claim 10, further comprising sleeping for a remainder of the first sniffing period if the step of checking for first data detects noise during the first sniffing period.

14. A data detection method comprising:
checking for receipt of first data over a first duty cycle;
checking for receipt of second data over a second duty cycle that is asynchronous wit the first duty cycle;
waking a controller when at least one of the first data and the second data are received; and
staying awake for an entire second sniffing period even if the step of checking for second data detects noise during the second sniffing period, wherein the first duty cycle intersperses a plurality of first sniffing periods between two consecutive second sniffing periods of the second duty cycle.

15. The data detection method of claim 10, wherein the waking step occurs if a selected number of consecutive edge intervals of the first data is received.

16. The data detection method of claim 10, wherein the waking step occurs if a consecutive number of bits of the second data is received.

* * * * *